United States Patent [19]
Schwartz et al.

[11] Patent Number: 6,049,603
[45] Date of Patent: *Apr. 11, 2000

[54] METHOD FOR ELIMINATING TELEPHONE HOLD TIME

[75] Inventors: Fred J. Schwartz; Steven H. Bazerman, both of New York, N.Y.

[73] Assignee: Call-A-Guide, Inc., New York, N.Y.

[ * ] Notice: This patent is subject to a terminal disclaimer.

[21] Appl. No.: 09/243,066

[22] Filed: Feb. 2, 1999

Related U.S. Application Data

[63] Continuation-in-part of application No. 08/937,647, Sep. 24, 1997, Pat. No. 5,903,642.

[51] Int. Cl.⁷ .................. H04M 3/432; H04M 3/523; H04M 3/527; H04Q 3/64
[52] U.S. Cl. ............................... 379/309; 379/209
[58] Field of Search ................... 379/209, 214, 379/265, 266, 309

[56] References Cited

U.S. PATENT DOCUMENTS

| | | | |
|---|---|---|---|
| 3,542,965 | 11/1970 | Wilkens, Jr. | 379/201 |
| 5,040,208 | 8/1991 | Jolissaint | 379/209 |
| 5,155,761 | 10/1992 | Hammond | 379/88.2 |
| 5,181,236 | 1/1993 | LaVallee et al. | 379/88.22 |
| 5,185,782 | 2/1993 | Srinivasan | 379/88.25 |
| 5,185,786 | 2/1993 | Zwick | 379/201 |
| 5,249,221 | 9/1993 | Ketring | 379/214 |
| 5,253,288 | 10/1993 | Frey et al. | 379/221 |
| 5,311,574 | 5/1994 | Livanos | 379/88.2 |
| 5,311,583 | 5/1994 | Friedes et al. | 379/209 |
| 5,436,967 | 7/1995 | Hanson | 379/266 |
| 5,537,470 | 7/1996 | Lee | 379/266 |
| 5,625,682 | 4/1997 | Gray et al. | 379/266 |
| 5,627,884 | 5/1997 | Williams et al. | 379/88.16 |
| 5,646,988 | 7/1997 | Hikawa | 379/266 |
| 5,903,642 | 5/1999 | Schwartz et al. | 379/309 |

*Primary Examiner*—Harry S. Hong
*Attorney, Agent, or Firm*—Bazerman & Drangel, PC

[57] ABSTRACT

A method, which may be carried through a computer and its modem or through voice contact, is used to minimize the telephone time necessary to establish direct voice contact with the computer technician or other service provider and to provide information to the technician about the computer system and program. When contact is made with the information provider, the caller indicates whether this is a reconnect or a new contact by supplying or not supplying a priority code. The caller is placed on a queue based on its priority code or if no priority code at the end of the appropriate queue. An indication of the current wait time for the particular product or problem taking into account not only the open lines currently in the queue, but other callers who will be calling back at an appropriate time is supplied the caller. The caller can (1) have the caller's computer automatically call back at the appropriate time without losing the place in line if the caller has a telephone connection to his/her modem; (2) call back on a telephone not connected to a computer with a priority number which will position the caller in the queue; or (3) continue to hold. If the information provider desires, it can eliminate or limit the third option to a maximum hold period.

19 Claims, 10 Drawing Sheets

METHOD FOR ELIMINATING TELEPHONE HOLD TIME

This application is a continuation-in-part of allowed U.S. patent application Ser. No. 08/937,647, filed Sep. 24, 1997, now U.S. Pat. No. 5,903,542, issued May 11, 1999.

BACKGROUND OF THE INVENTION

This invention relates to inbound telephone call processing and, in particular, to a method for automatically processing telephone calls to an information provider, such as computer technical support, to eliminate long hold times and to automatically provide certain information to the information provider prior to direct telephone contact between the caller and the provider.

Information, such as technical support for both computer hardware and software, is provided by telephone calls made by the caller to a technical support or communication center. There are usually long delays in which the caller is held on telephone queue awaiting the availability of a person, such as a computer technician. Depending on the company and its technical support system, this telephone time may be charged by the telephone company either to the support service or the caller. The end result is a substantial charge to one or the other. Since the information provider would not wish the caller be given a busy signal, the information provider must have a large number of lines to be held open while the caller awaits contact with the appropriate person. In addition, in the area of computer technical support, when a technician is finally reached, he must spend a substantial period of time obtaining information about the caller's hardware and software, as well as obtaining diagnostic information which would aid the technician in evaluating the problem.

Typically, hold times for technicians in the computer area are, at a minimum, on the order of ten to fifteen minutes and sometimes extend far beyond, especially when a new product becomes available to consumers. Busy signals and long hold times effect the caller's attitude to the service provider with a resulting negative impact on future purchases by the caller. Computer magazines frequently present articles concerning customer service which prominently feature the time the caller is kept on hold and recommend purchase based on customer service.

Some attempts have been made to eliminate this problem by use of a system which automatically obtains the caller's telephone number, disconnects and returns the call at the time when the caller would have been serviced had the caller stayed on hold, such as seen in U.S. Pat. No. 5,627,884, issued May 6, 1997 to Williams et al.; U.S. Pat. No. 5,185,782, issued Feb. 9, 1993 to Srinivasan; U.S. Pat. No. 5,155,761, issued Oct. 13, 1992 to Hammond; U.S. Pat. No. 5,181,236, issued Jan. 19, 1993 to LaVallee et al.; and U.S. Pat. No. 5,185,786, issued Feb. 9, 1993 to Zwick. These systems shift the burden of the payment for the return call to the technical service department since it initiates the return call where the majority of the telephone time will be spent in aiding the caller. Since the trend is for the callers to pay for the telephone time for customer service, if not the service itself, such runs contrary to current practice. Callers also have a distrust of call-backs, in most cases, because the callers do not believe that they will, in fact, have preference over the people who have held on to the phone line and because callers are not aware of their own availability at the time the call back is actually made.

SUMMARY OF THE INVENTION

In the present invention, a method which may be carried out by a computer, hub, server or PBX system, is used to minimize the telephone time necessary to establish direct voice contact with the computer technician or other service provider and to provide information to the technician about the computer system and program, greatly reducing time charges and the number of lines necessary to maintain a caller's support system. In the first embodiment, the caller accesses the technical support through the caller's own computer. The caller may initiate the call to technical support through a "technical support" entry in the help menu of the appropriate program, through an entry on the start menu or by an on-screen URL. The program as called up, can be limited to one service provider or to a number of providers. If the latter, the caller will, through dialog boxes, select the server/provider he/she is interested in contacting. The computer will then contact the appropriate technical support group either through a modem or through the use of the internet.

When contact is established with the information provider's PBX, internet server or hub, the caller's computer sends a signal, indicating whether this is a reconnect or a new contact and, if a reconnect, an identifying priority code. The caller's PIN, telephone or serial number can act as a priority code. It can be sent by the caller's computer or for telephone numbers included as priority code, it can be read by caller I.D. If the customer support line is for a number of programs or if there are different queues for different problems, a dialog box can be used to supply the necessary information to select the appropriate queue. Such dialog boxes can be uploaded to the support telephone system or be retained in the program itself. The technical support PBX, internet server or hub, then provides an indication of the current wait time for the particular product or problem taking into account not only the open lines currently in the queue, but other callers who will be calling back at an appropriate time. The caller will then be informed of length of the wait and that the caller can (1) have the caller's computer automatically call back at the appropriate time without losing the place in line; (2) call back on a telephone not connected to the computer with a priority number which will position the caller in the queue; (3) continue to hold. If the information provider desires, it can eliminate or limit the third option to minimize hold time.

If the caller elects to remain on line, the program performs no further function with regard to hold time but merely supplies information concerning the caller's hardware and software to the information provider at the appropriate time. If the caller wishes to call back, either through the computer or manually, the caller so indicates through his/her computer. The service provider's computer then supplies a priority code corresponding to the caller's place in line. It may be encrypted in order to prevent hacking of the position in line to give a preference to the more advanced programmers. Alternatively, if a PIN, telephone number or serial number was supplied by the caller's computer or the caller's telephone number was read by caller I.D., the place in the queue could be maintained by the service provider's computer, which could recognize the caller by its PIN, telephone or serial number upon call back.

Subsequent computer calls ("call back" or "reconnect") may be to a different number than the initial contact number. This phone number can be supplied at the same time as the information as to place in line is forwarded to the caller's computer. The program then breaks the telephone connection. If the caller is connected through the internet, the caller may break the internet connection, slag on line with the service provider, reviewing or vising other matters and help materials on line, other internet sites until it is time to again contact the service provider.

At the call-back time, the computer generates a dialog box asking the caller if the caller wishes the computer to reconnect to the service provider or the caller wishes to call back manually, using a conventional telephone. There can also be an audible signal. If the caller is still at the computer but is busy, the caller can initiate the snooze function and be reminded again ten or fifteen minutes later so the caller would not have to break, for example, an internet connection with a particular site. When the caller indicates that he is ready for the phone call and he/she wishes the computer to place it, the program will then place the phone call to the appropriate number and when answered by customer service, will supply its encrypted position in line, caller's telephone number, a PIN or serial number, or all four. At this point, the caller will be properly positioned in the queue for voice and data connections.

If the last time estimate was incorrect and it appears that there will be an extended wait, the PBX, internet server or hub can so inform the caller's computer and a dialog box could appear indicating the appropriate time of the wait and if the caller wishes to call back, as in the start of the process.

The caller may call back on a phone not connected to the modem and during the initial message enters his/her priority code by means of the phone's key pad. The customer support system will use the number to properly position the call in the queue. In either case, the priority code will have a limited life of a few hours to prevent abuse of the system.

In order to aid the technician and eliminate the time normally spent in questioning the caller about his/her system, the caller's computer can forward information about the computer and its software, such as the identity of the caller, e-mail address, telephone numbers, the identified CPU, the amount of RAM, other programs, conflicts, diagnostic information, etc., which can be displayed on the technician's screen before or at the time the technician commences voice communication. Additional information on a particular problem can also be gathered through one or more menus which can be sent to the technical support personnel immediately before voice communication is commenced.

In a second embodiment, a modification of the method of the first embodiment is carried forward through the use of voice mail. The customer support computer, internet server, hub or PBX, as the case may be, attempts to read the caller's telephone number through caller I.D. If the caller I.D. is not blocked and the number is already on a queue, the customer service computer, hub or PBX determines on which queue the customer is waiting and ascertains if the customer wishes to re-contact on that queue or has a question which requires being placed on a new queue. If the call is a true call back, the caller is then placed on the selected queue based on the caller's initial call time. If wishing a new queue, the call goes to through the normal selection process for a new call. If caller I.D. is blocked, the caller is asked to supply his 10 digit telephone number or code, the latter step can be performed at the end of the process rather than here. If the caller indicated that this is a call back, and supplies appropriate identification, the PBX, hub or customer service computer then checks if the I.D. is on a queue and, if so, treats it as a call back in the same way as if the number had been supplied by caller I.D. or if it is a new call, the caller then goes through pre-existing supports using the telephone buttons to select various options until an appropriate queue is reached and the system then puts the customer at the end of the selected queue by code. If the caller can be put into voice contact with the service provider within a set time limit, the caller holds until the customer support personnel becomes available. If, on the other hand the caller's computer, internet server, PBX or hub calculates that the wait time is more than the minimum, the caller is given a brief explanation on how to use the system information, asked to call back at a specified time, and where there was no caller I.D. identification and the caller has not supplied a ten digit priority number, to supply such number. The customer may also be supplied the estimate of the wait time on several occasions during this process.

The above message can be carried forward using a number of different systems to make connection with and exchange information to the service provider. With regard to the first embodiment, contact with the service provider's computer, PBX or hub may be through modems with the caller's computer directly dialing the service provider's computer. The modems could be dual modems to allow joint transmission of data and voice or some of the steps could be performed by modem and some of the steps on direct telephone voice connection. Alternatively, communication between the caller's computer and/or the caller, and the service provider can be done over the internet using IP protocol which allows both voice and data transmission. The second embodiment can either be conducted through normal voice mail contact over standard telephone lines or through the use of the internet using IP protocol.

DETAILED DESCRIPTION OF THE PREFERRED EMBODIMENTS

Figure 1:
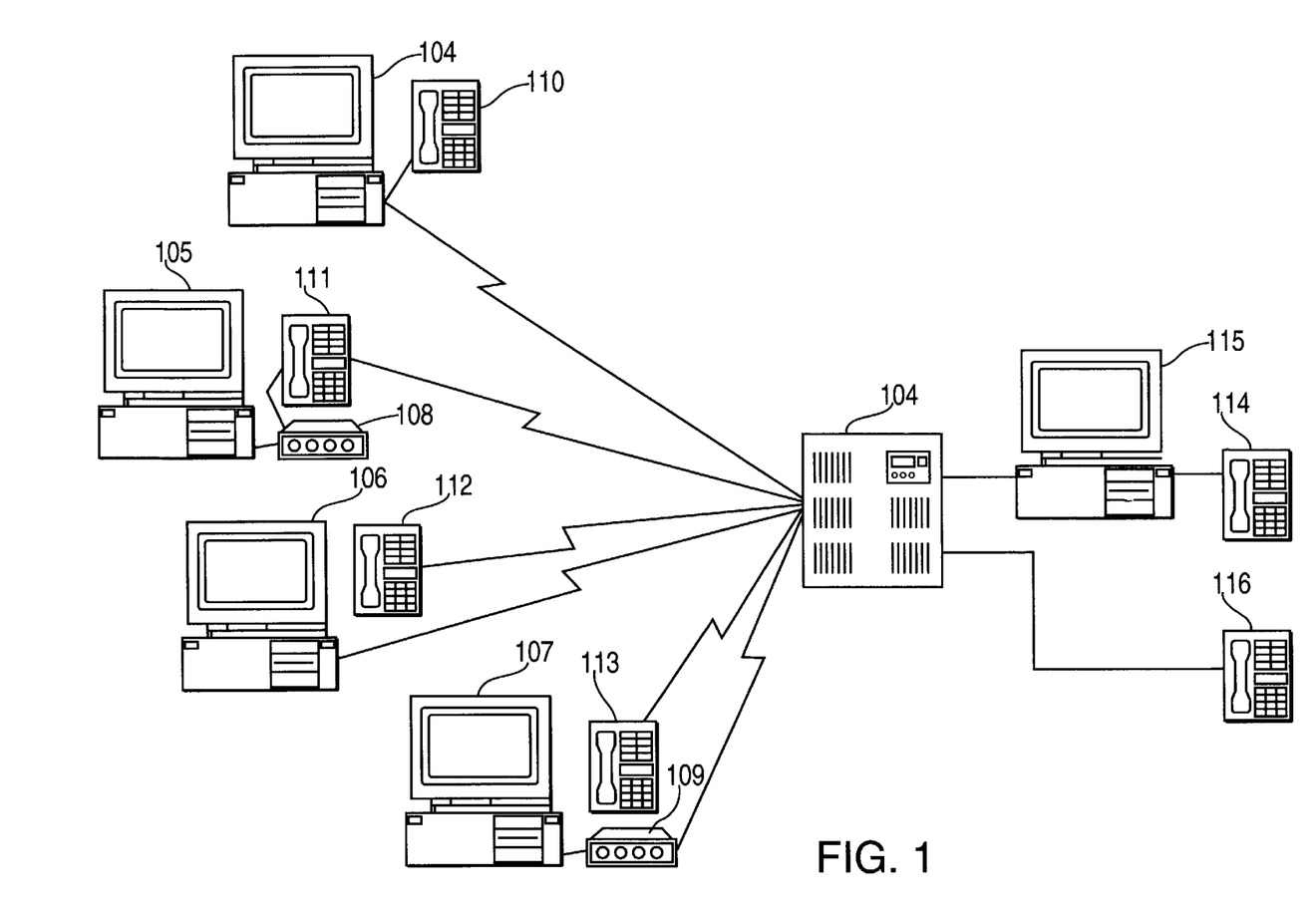
FIG. 1 is a block diagram of the apparatus for carrying forward the method of the first and second embodiments of the present invention using a direct data and voice telephone connection with a service provider.

FIG. 1 illustrates a typical configuration of hardware to carry forward the first and second embodiments of the present invention in which the caller enters into communication with the service provider through the use of modem interaction or through voice mail using conventional telephone connections. The caller can contacts an information provider, such as technical support service for a computer program, by initiating a call through the respective computers 104 through 107. Computer 104 has a telephone handset 110 attached to its internal modem (not shown). Computer 105 has en external modem 108 to which is attached telephone handset 111. Similarly, computer 106 has an internal modem (not shown) and computer 107 an external modem 109. Telephone handsets 110 and 111 are attached to the modem for their computer 106 and 107. Telephone handsets 112 and 113 are not attached to their respective modems, but are directly attached to the telephone systems without connection through the computer 106 or modem 109. Alternatively, the second embodiment ofthe present method can be by telephonic connections from handsets 110–113, without interaction with the computer. The technician would normally have a computer 115 with an internal modem, not shown. Telephone handset 114 is attached to the PBX 140 through the technician's modem or in the second embodiment, directly to handset 116.

Figure 2:
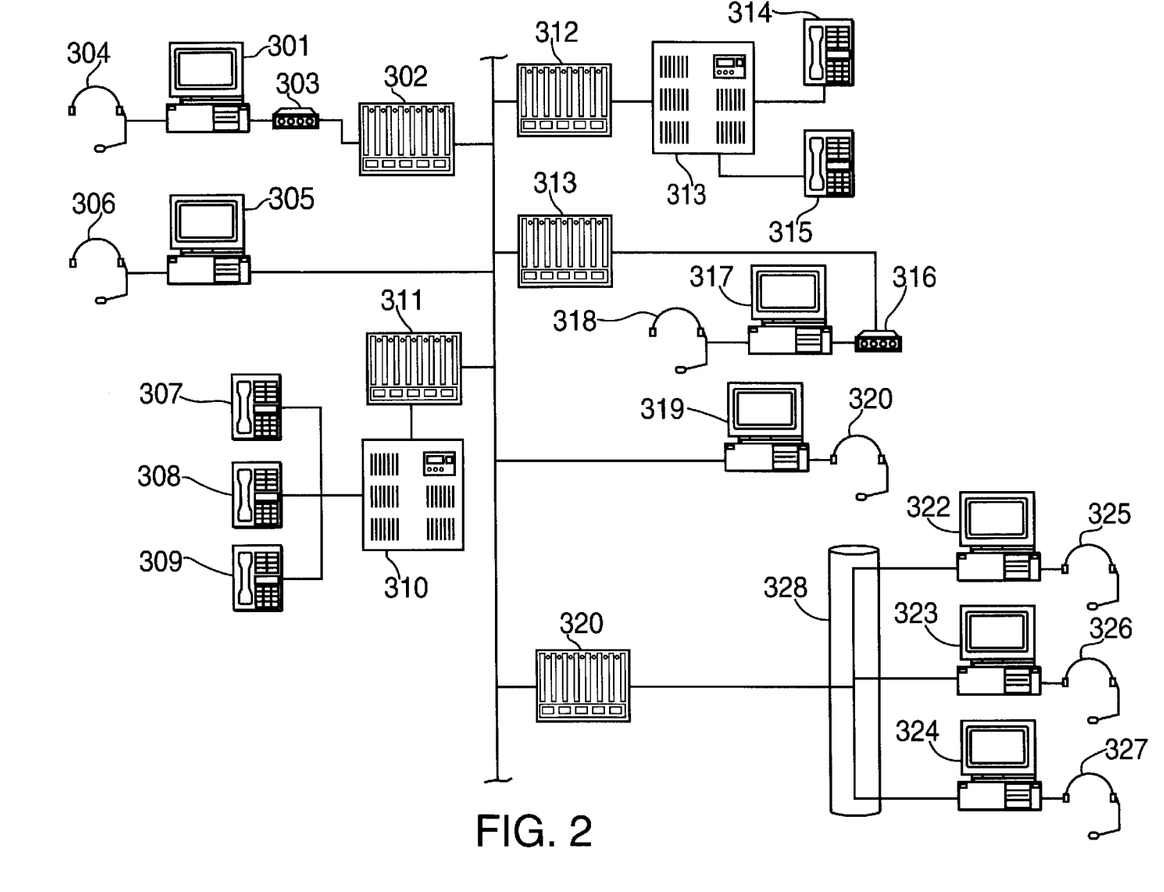
FIG. 2 is a block diagram of the apparatus for carrying forward the methods of the first and second embodiment using an internet connection and IP protocol to exchange information with the service provider.

FIG. 2 illustrates the use of the internet to simultaneously carry out the methods of the first and second embodiments of the present invention for different callers contacting the same or different service provider. The internet is essentially a giant computer network. Communication over the internet is under the internet protocol (IP) which allows transmission of voice, video and data. The internet may be accessed and information transmitted over it in a number of ways. The caller's computer 301 may contact an internet server or hub 302 through a modem 303. Communication between the computer 301 and the internet server or hub 302 is through a web browser installed on the caller's computer 301. Vocal communication can be inputted from headset and microphone 304 into the computer's sound card which converts it to a signal which can be sent through the browser to the internet hub 302. The server or hub 302 which is either a Windows NT or Unix server, will then translate the signal from modem 303 into internet protocol. If the caller's computer is directly connected to the internet by a T1 line or the like, the computer 305 can directly transmit both the voice from headset 306 and data over the internet without a server or hub 302.

If only voice contact, using the voice mail system, is desired, telephone 307, 308, 309 can be directly connected to a PBX 310. PBX 310 is connected to the internet server or hub 311 which would convert the voice signals to IP protocol. While the PBX and the hub are described as separate units, in reality, they can be simply a computer, including a personal computer, which may have one or more additional boards to allow the conversion of telephone signal to internet protocol and allow the normal switching functions of a PBX.

In receiving a telephone call, an internet server or hub 312 can be in contact with or include a PBX 313. The internet protocol message will be converted by such server or hub 312 to produce a telephone signal for appropriate distribution to the service provider's telephones 314 and 315. Alternatively, an internet server or hub 312 can be connected through a modem 316 to the receiving computer 317 and, thus, to headset 318. If a receiving computer or the service provider 319 has a direct T1 or like line connecting it to the internet, and the appropriate software such as Windows NT workstation, it can be directly connected to the internet without use of a hub and voice transmissions can be had through earphones and microphone combination 320. Finally, an internet server or hub 321 may be connected to a network such as a T10 line 322. Computers 323, 324, 325 on the network will then have a direct connection with internet server or hub 320. They, in turn, would have, for voice communication, their respective earphones and microphone 326, 327 and 328 connected to their sound cards.

A flow diagram of the first embodiment is seen in FIG. 2–5. Once a caller makes the determination to contact technical support or other information provider 200, the caller, through his/her computer 104–107 initiates the contact 201. How the caller initiates the software to contact the technical support service or other information provider PBX 140 depends on the operating system of the computer and the nature of the program itself. For example, if the operating system is Windows 98, one can initiate the program by having an icon on the desktop, by having an option in a help menu or in the start menu for the program to be supported or there can be a single program which offers support for a number of different technical support lines. Once the program is initiated, a computer 104–107 will continually dial the appropriate technical support service using a telephone number which is incorporated in the program 202. Once contact is made with the technical support PBX 140, the caller's computer can exchange information with the PBX 140 or a support computer which is connected to the PBX 140 (not shown). If this is a call back (reconnect) after a previous contact with regard to the same problem, the caller's computer 104–107 can supply a priority number, PIN number, telephone number or serial number 203 which will be used to properly position the telephone call in the appropriate queue 208. It may also be useful to prevent abuse of the system, to give the priority code a limited life so that if the caller does not call back within the prescribed time period the PBX would refuse the priority and/or the caller's computer will cease offering to contact the PBX to accomplish this. The priority number can be reviewed to see if it is valid and within acceptable time limits for reconnect 204. If not, it can be treated as an initial contact. If this is the initial contact with regard to this problem and there are multiple queues, the PBX 140 can forward the text for a dialog box to determine which queues is appropriate 205. The caller will respond and forward to the PBX 140 the requested information 206. If this is a reconnect but the priority code is invalid or outside the time limit, the screen can so inform the caller and indicate that he/she will be treated as a new caller. The new caller will then be positioned at the end of the appropriate queue on a time received basis 207. Flow chart items 209 and 210 show the interconnection of the flow diagram of FIG. 2 and FIG. 3.

Figure 3:
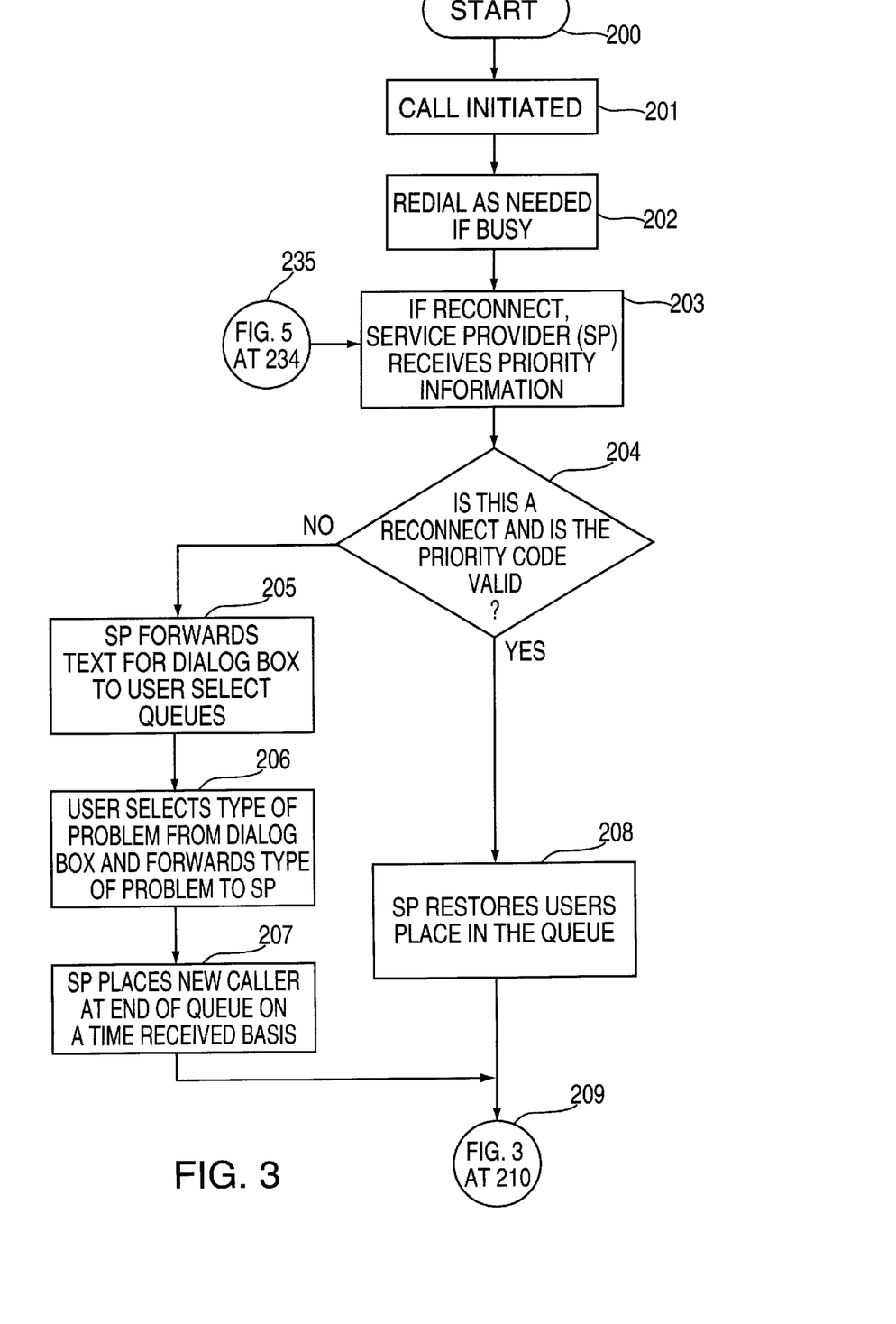
FIGS. 3–7 are flow charts of the steps taken by the caller in the first embodiment through the use of inter computer communication

Thus, the call is positioned on the queue depending either on reconnect priority information or if a new caller, on the basis of the time the phone call was received. The PBX 140, or a computer working in conjunction with the PBX 140 (not shown) calculates the approximate wait time to the caller, based on the average length of call, the number of calls holding and the priorities previously issued which will come back on line prior to the caller coming into contact with the technical service computer 211 and so informs the caller. At this point, the PBX queries the caller as to whether to hold or disconnect and redial after the approximate wait time 212. If the calculated approximate wait time is more than a certain amount, the PBX 140 or related computer can eliminate the alternative of holding and require the caller to call back in accordance with the calculated wait time. If the caller chooses to hold and the technician is available within a set time period 213, the caller's computer can forward information 214 directly to the technician's computer 115 through PBX 140. Such information may include the hardware contained in the caller's computer, the software, conflicts, diagnostic information, such as Dr. Watson®, which information can be gathered from the caller's computer 214 by the program either during set up of the program and/or at the time the program is initiated. This information would be displayed on computer 115 and voice contact established between the caller and the technician 216. If the callers 104, 105 and the technicians' computers 115 have the capacity for simultaneous transmission of data and voice, they can be transmitted simultaneously. The data channel can then also be left open for transmission of diagnostics and other information during and simultaneously with the vocal communications.

If, however, the support service does not pick up within a set time 213, the PBX or computer recalculates the wait time and transmits it to the caller 211. Again the caller is given the option of holding or reconnecting at the new estimated time 212.

Figure 4:
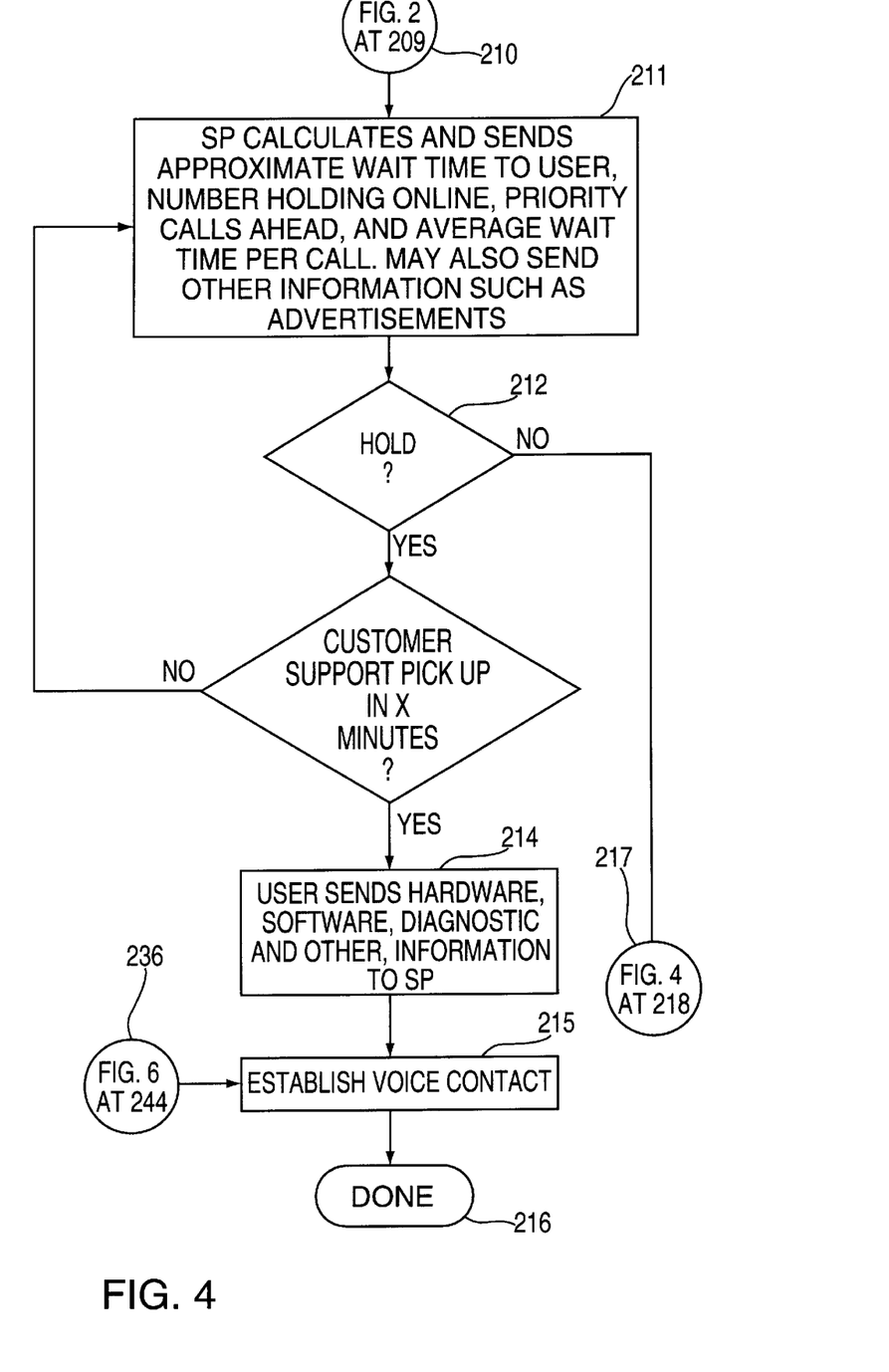

Flow chart items 217, 218 show the interconnection between the flow chart of FIG. 3 and FIG. 4. If a decision is either made by the caller or the computer that the caller should not hold and the call is not a reconnect with a priority code already established 219, the PBX forwards a priority code 221 to the caller's computers 104–107. Alternatively, the caller's pin, telephone number, etc., can be used to identify the caller. If the technical service department desires to have the caller call back at a different phone number 222, it can forward such new phone number 223 to the caller's computer 104–107. Such alternate phone number might be useful to direct calls to specific problems, to use a local service centers, or to allow the use of an "800" number for the initial contact and normal area code dialing for the actual support. The reconnect information is displayed on the caller's computer 104–107, including number information and priority code 224. The caller's computer then automatically disconnects the telephone line 225. Instead of basing the positioning in the queue on the use of a priority code, the caller's computer can supply its PIN number or serial number to the PBX 140 or its associated computer and the queue can be maintained by the PBX 140 or associated computer.

Figure 5:
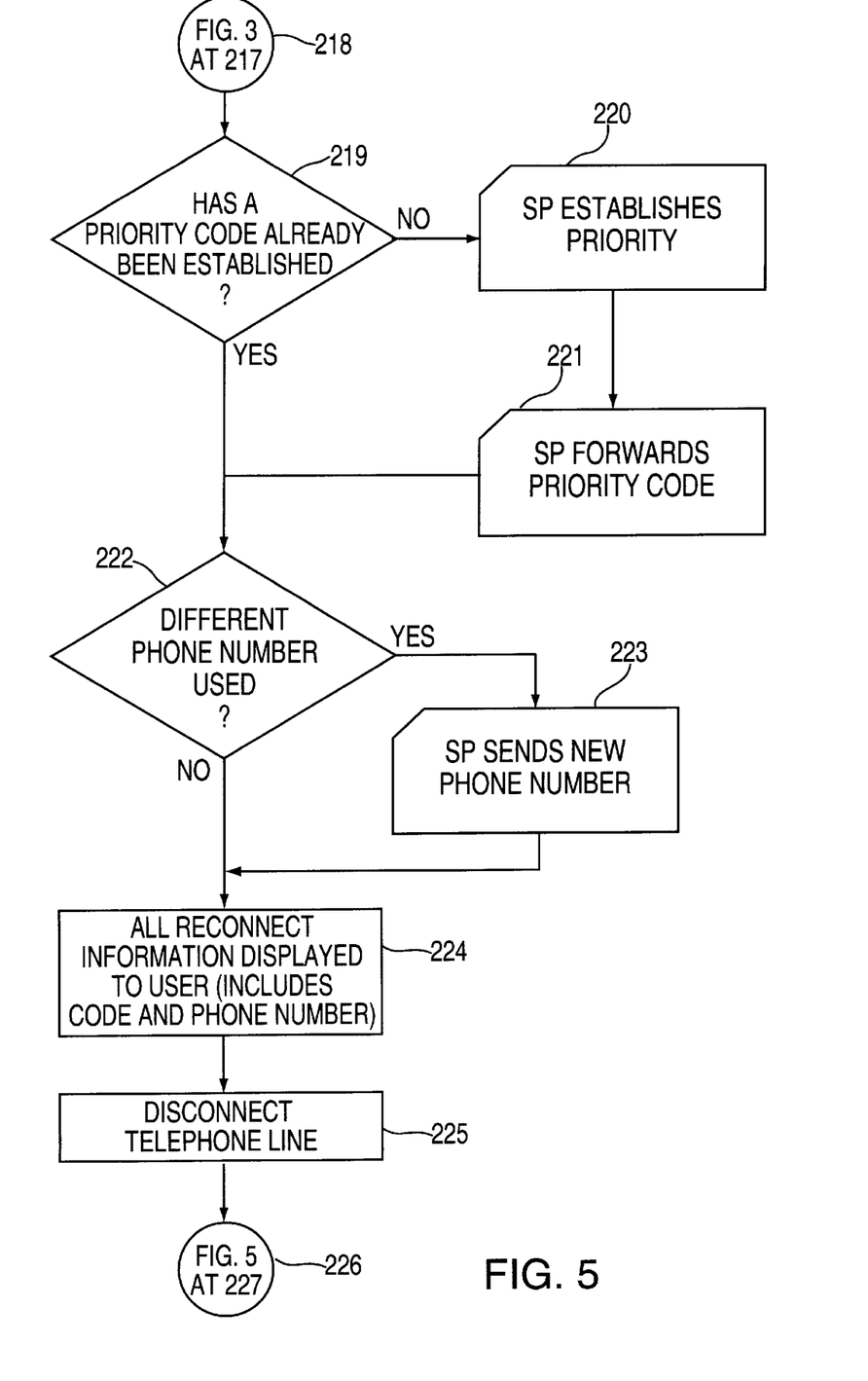
Figure 6:
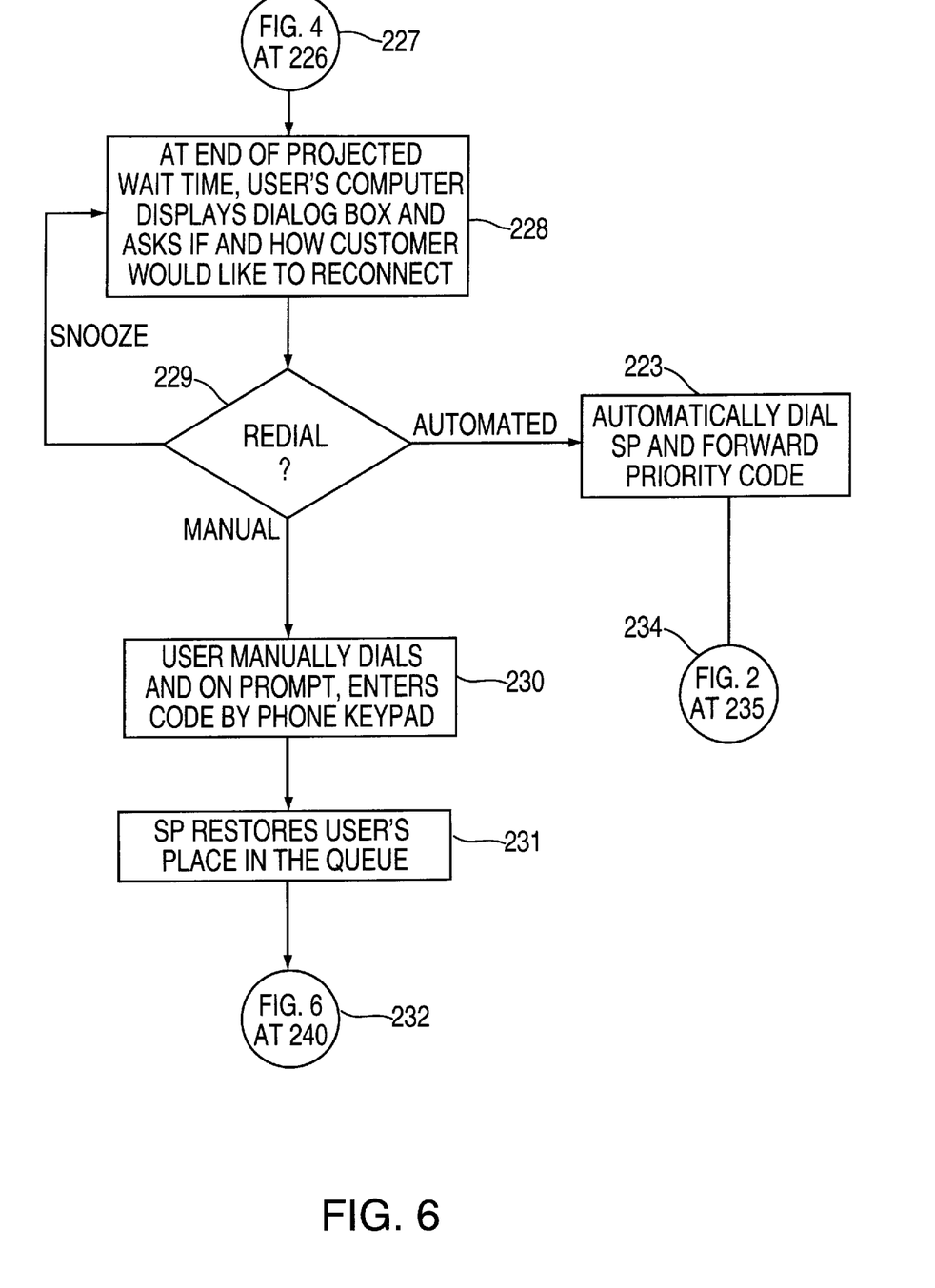
Figure 7:
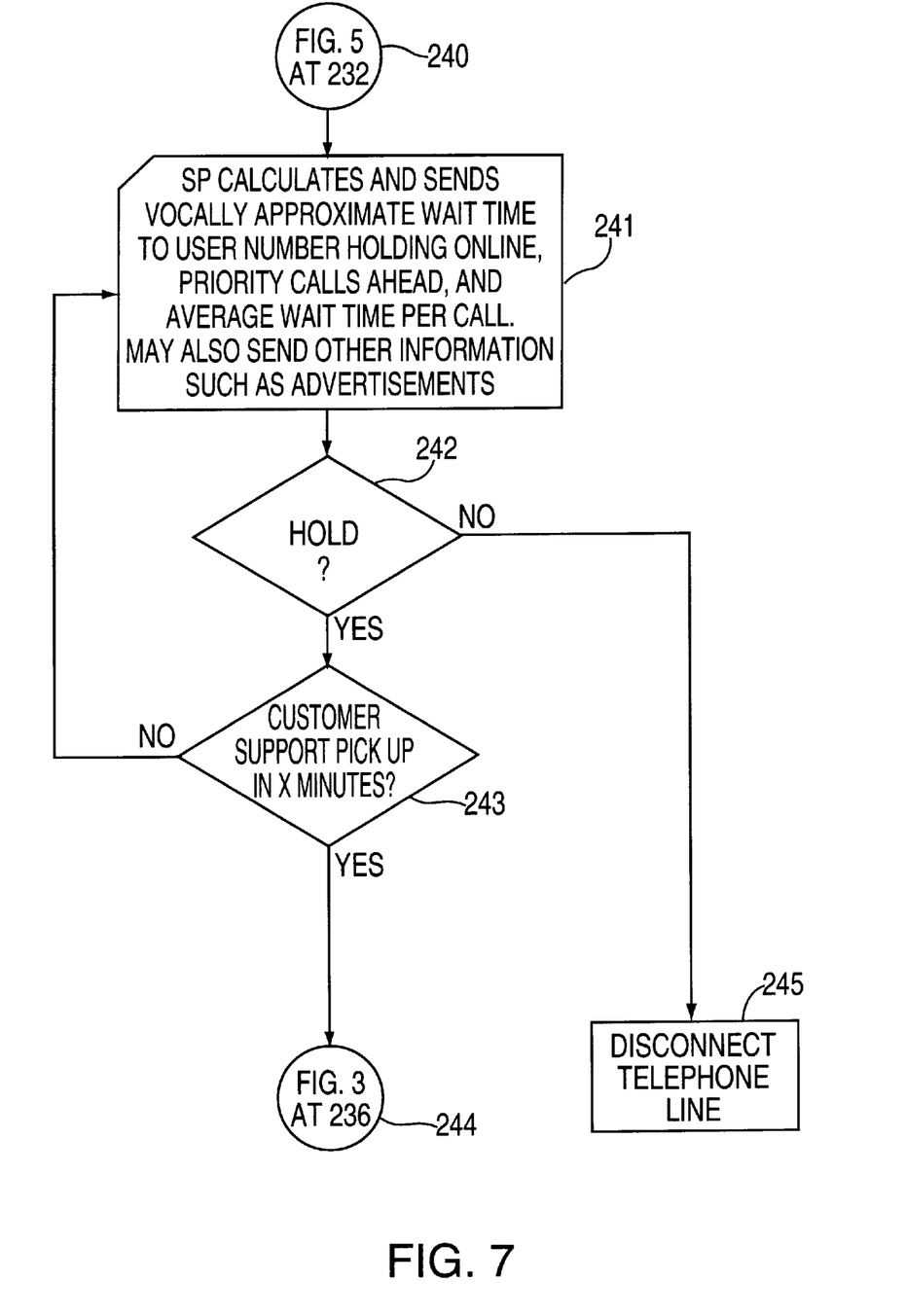

Flow chart items 227, 232 and 234, show the interconnection of the flow chart of FIG. 5 with the other figures. After the caller is disconnected, the caller's computer 104–107 will, at the end of the wait time, initiate a dialog box to ascertain how the caller would like to reconnect 228. The screen can display phone numbers and priority code. The caller would be given three options 229, automated response, manual response or to snooze. If snooze is selected, the same dialog reappears after a set period of time. If automated response is indicated, the program automatically dials the PBX 140 and forwards the priority code 223 and then reconnects 234 to the program at step 209 as seen in FIGS. 5 and 6. If manual is selected as the connection, the caller manually dials the number displayed on the screen and on the prompt enters the priority code displayed by means of the key pad 230 and the caller is redirected to his place in the queue 231. Since the contact is by direct phone contact rather than through the modem, the manual caller will be unable to send the hardware, diagnostic and other information to the PBX 140. Just as a caller of automated reconnect is informed of his place in line by dialog boxes, automated verbal information may be supplied to the caller 241, who can have the option of terminating the call and reconnecting at a later time using the same priority code or holding 242, 236, 245. If the caller decides to hold, his wait time can be constantly updated 243. While holding, advertisements can be forwarded to the caller's computer or the caller's handset depending on whether the call is made through the modem or not.

If the process is not carried out over the internet or using modems which allow combined data and voice transmission, the data on the identification of the calling computer can be sent at the time of the initial data transmission to obtain a place in line and stored on the service provider's computer.

Figure 8:
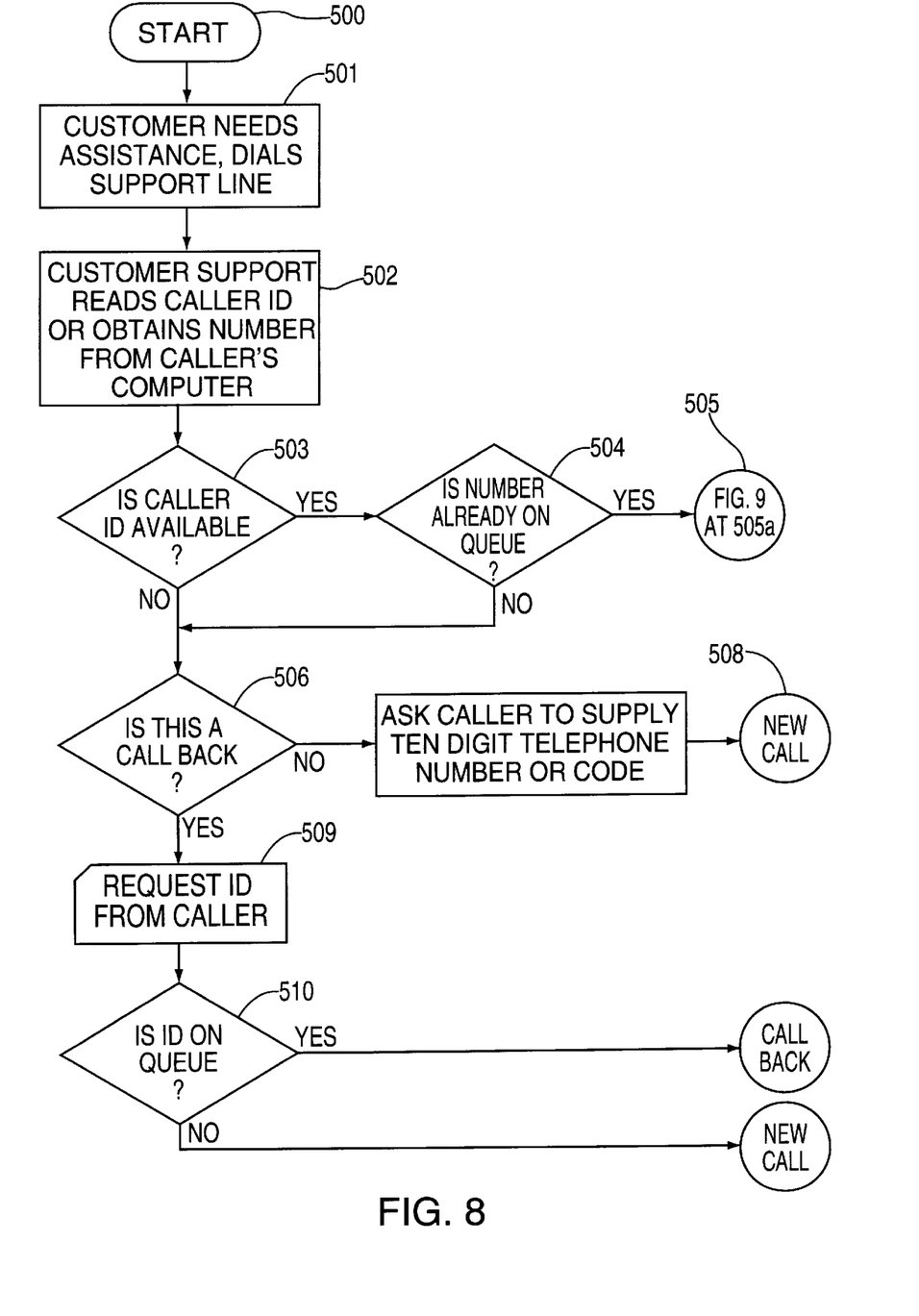
FIGS. 8–10 are flow charts of the steps taken by the caller in a second embodiment through the use of voice mail.
Figure 9:
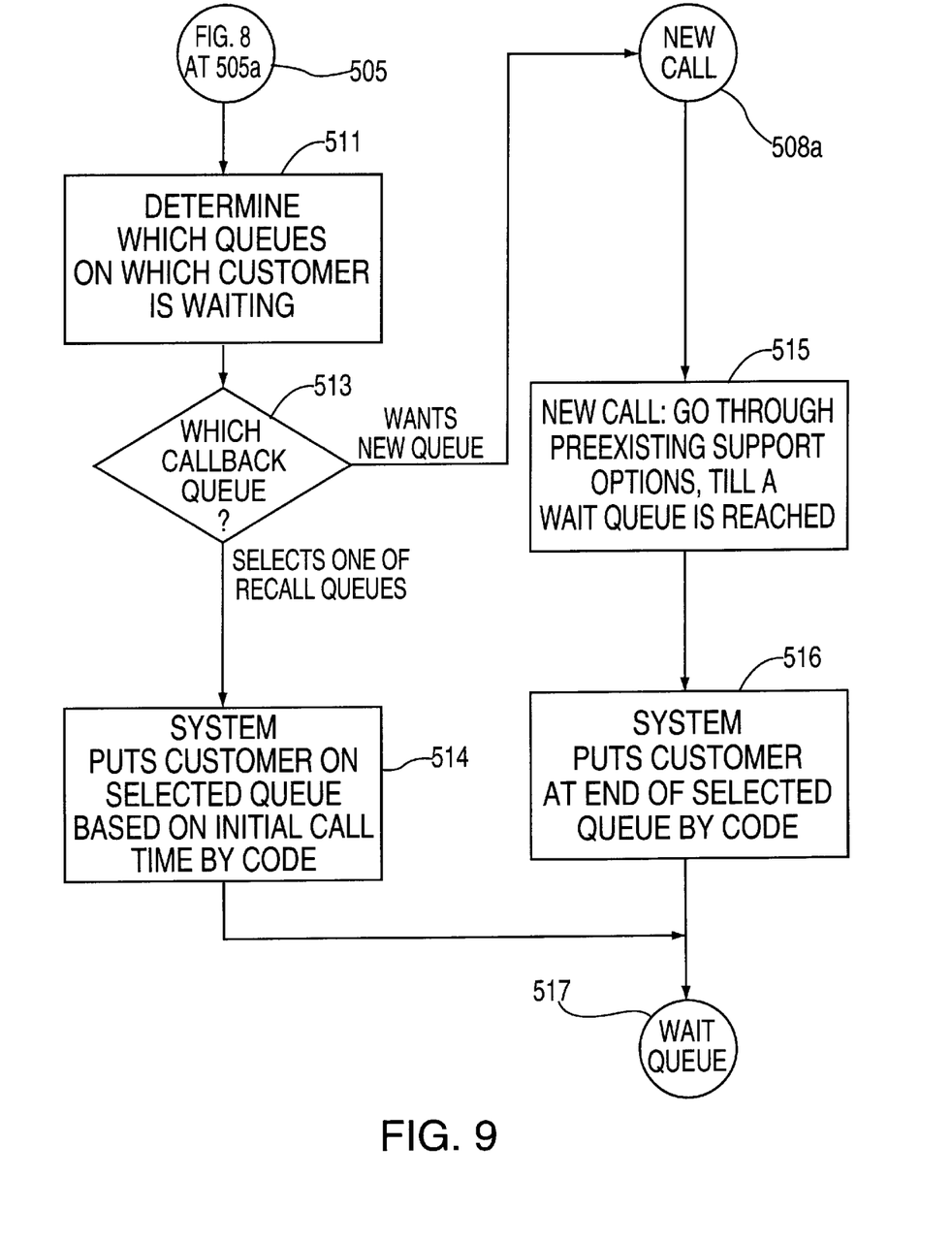
Figure 10:
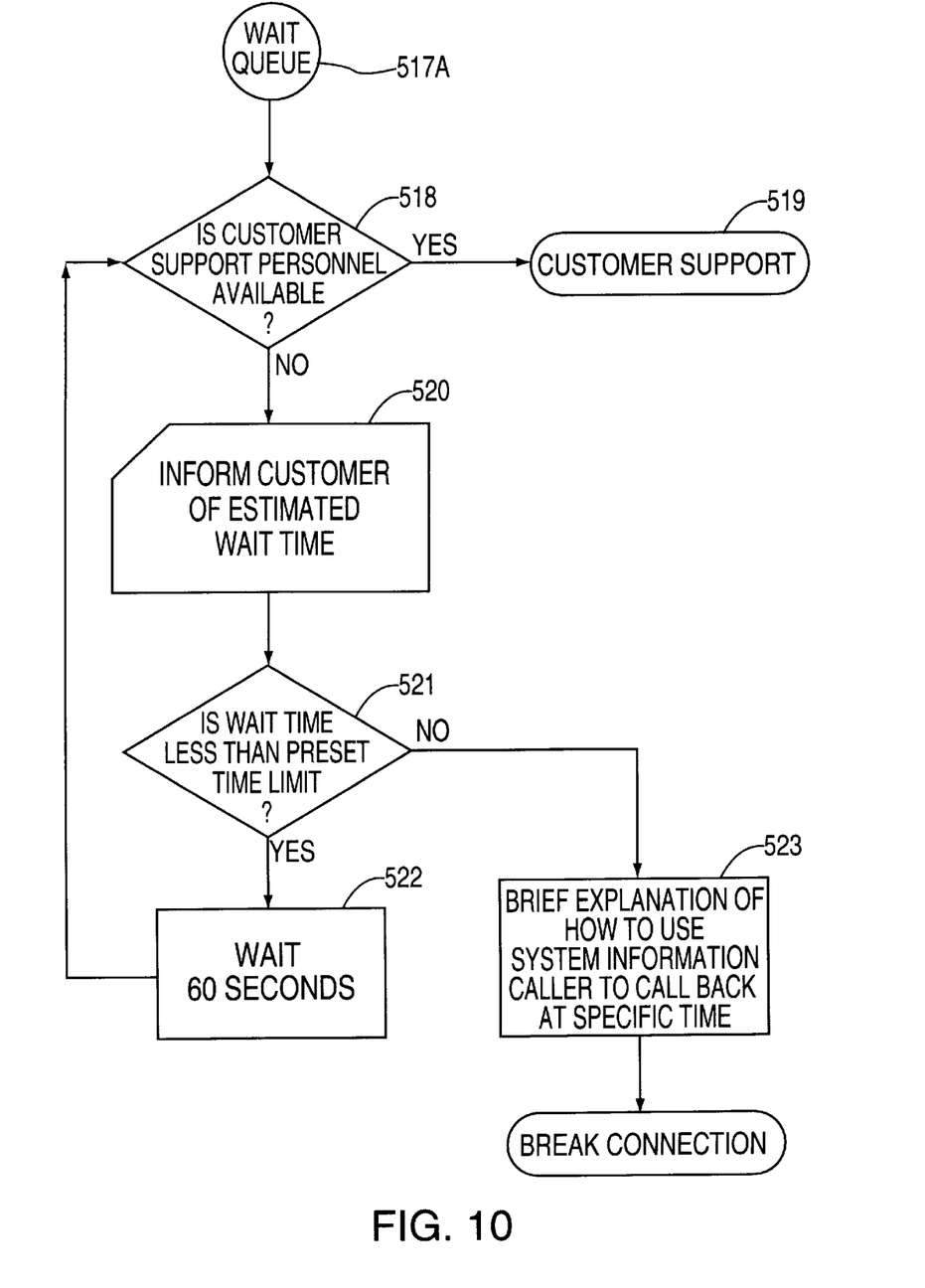

In the second embodiment, a conventional voice mail system is used to obtain a position in line and to provide an appropriate priority code and wait time to allow a caller to call back at an appropriate interval and be correctly placed in line according to his original call time. A customer who needs assistance 500 can dial the support line 501 either through conventional telephonic connection 501 or by means of the internet using IP protocol. When a connection is established, the customer support's PBX computer or hub attempts to read the caller's caller I.D., if it can obtain from the caller's computer the caller's computer's telephone number 502. If an identification of the caller's telephone number, whether through caller I.D. or through the computer, is obtained, the customer service computer, PBX or hub determines whether the number so obtained is on a queue 504, if so, the number is treated as a call back 505, 505*a*.

On the other hand, if the caller's telephone number cannot be obtained, whether because the caller I.D. is blocked or because the caller's computer cannot be accessed to obtain its telephone number, the voice mail system requests information as to whether this is a call back 506. If the answer is "no," the system is explained to the caller and the caller is asked to supply the telephone number from which the re-connection will be made. Alternatively, the caller can supply an arbitrary 10-digit number and then, the call is treated as a new call 505A. Alternatively, such input as to a code can be at the end of the process (not shown).

On the other hand, if the caller indicates in response to the query of step 506 that this is a call back, the caller whose phone number was not ascertained by the computer is asked to supply the telephone number from which the original call was made or the priority code if other than the telephone number 509.

The PBX, computer or hub then determines whether the I.D. is on a queue, if "yes" it is considered a call back 505*a*, and if not it is considered a new call 508*a* since obviously the caller either has exceeded his time limit to call back or entered an incorrect code number.

In a call back 505*a*, the service provider's computer, hub or PBX determines which queues on which the customer is waiting and, if on more than one queue 515, the caller is requested to designate which queue it wishes or if it wants an new queue 515. If it wants a new queue, it is treated as a new call 515. If on more than one queue, the caller selects a particular queue 513. The caller is then placed on the selected queue based on the initial call time the caller first called using its priority code 514.

New calls 508*a* go through a list of support options to determine which queue is appropriate to the caller and puts the customer at the end of the selected queue 516 using as a code either the caller's telephone number or, if not available, the ten digit telephone number or code supplied by the caller and transfers the call to the wait queue 517A. On the wait queue 517A, the hub, computer or PBX of the service provider determines whether there is customer support personnel available. If so, the call is immediately directed to customer support 519. If not, the customer is informed of the estimated wait time 520. If the wait time is less than a pre-set time limit 522, the call is held for 60 seconds and then put through the same process until customer support is available. On the other hand, if the wait time is greater than the pre-set time limit, the customer is given a brief explanation of how to use the system, and supplied with a specific time to call back 523. If desired step 507, that is asking caller to supply ten (10) digit telephone number or code, can be done at this point rather than at the initialization of the telephone message.

Instead of automatically terminating a call if the wait time is above a pre-set time limit, the service provide, at its own option, may allow the caller to select whether it holds despite the wait or uses the present system to break the connection.

While the present invention is discussed in terms of computer technical support, the invention is equally applicable to any contact where there is a large number of callers or customers and the party to be contacted has a limited number of persons to respond such as would occur when a person is attempting to contact a government agency, customer ordering departments, customer complaint departments and the like. Equally, while the invention has been discussed in terms of using a priority number generated from the caller's telephone number or by an arbitrary number, the software's own PIN or serial number may be used and the PBX maintain the queue, as discussed above. If priority codes are used, they should be encrypted such as to make it difficult or impossible for the caller to obtain a higher priority than the caller is entitled.

It is understood that the present embodiment described above is to be considered as illustrative and not restrictive. It will be obvious to those skilled in the art to make various changes, alterations and modifications to the invention described herein. To the extent that these variations, modifications and alterations depart from the scope and spirit of the appended claims, they are intended to be encompassed therein.

We claim:

1. The method of prioritizing incoming calls and arranging for such incoming calls to be connected to a receiving party for voice contact at a later time, consisting of the steps of:
   a. the caller temporarily establishing a communication connection with the receiving party;
   b. establishing a priority code, if the incoming call does not already have a priority code;
   c. establishing a place on the queue of incoming callers based on the priority code;
   d. establishing a time to reconnect;
   e. forwarding to the caller said established time to reconnect and, if not previously supplied, a priority code to the caller; and
   f. breaking the communication connection.

2. The method of prioritizing incoming calls according to claim 1 wherein the caller reestablishes a connection with the receiving party at approximately the time established for reconnection, supplies a priority code and is placed in proper position in queue based on the caller's priority code.

3. The method of claim 2 wherein the caller is automatically reconnected and the priority code is automatically supplied to the receiving party.

4. The method of prioritizing incoming calls according to claim 1 wherein the caller line in a queue is automatically calculated from the time that the caller first establishes the temporary communication connection.

5. The method of prioritizing incoming calls according to claim 4 wherein the time to reconnect is based upon the number of calls holding, the number of calls given reconnect priorities and the average time for each call.

6. The method of prioritizing incoming calls according to claim 1 wherein a new telephone number is used to reconnect the call at a later time.

7. The method of prioritizing incoming calls according to claim 2 wherein the queue is for voice contact with the receiving party.

8. The method of prioritizing incoming calls accordingly to claim 7 wherein information supplied by the caller is automatically transmitted to the receiving party.

9. The method of prioritizing incoming calls according to claim 8 wherein information from the caller is automatically transmitted to the receiving party at the time the caller is about to be placed in voice contact.

10. The method of prioritizing incoming calls according to claim 2 wherein during the period the caller is in communication connection with the receiving party prior to voice contact with the receiving party, the caller receives information.

11. The method of prioritizing incoming calls according to claim 2 wherein when the caller reconnects, the caller is given information as to the wait time and the option of holding or reconnecting at a later time.

12. The method of prioritizing incoming calls according to claim 10 wherein when the projected hold time is greater than a set amount, the caller is not given the option of holding.

13. The method of claim 1 wherein the communication connection with the receiving party is through voice mail.

14. The method of claim 1 wherein the communication connection with the receiving party is through data communications between computers.

15. The method of prioritizing incoming calls and arranging for such incoming calls to be connected to a receiving party for voice contact at a later time, consisting of the steps of:
   a. the caller temporarily establishing a communication connection with the receiving party;
   b. establishing a priority code;
   c. establishing a place on the queue of incoming callers based on the priority code;
   d. establishing a time to reconnect;
   e. forwarding to the caller said established time to reconnect;
   f. breaking the communication connection; and
   g. automatically reminding the caller of the time for the caller to initiate reconnection to the receiving party.

16. The method of prioritizing incoming calls according to claim 15 wherein the caller reestablishes a connection with the receiving party at approximately the time established for reconnection and is placed in proper position in queue based on the caller's priority code.

17. The method of claim 16 wherein the caller is automatically reconnected and is automatically placed in position in the queue.

18. The method of claim 15 wherein the communication connection with the receiving party is through voice mail.

19. The method of claim 16 wherein the communication connection with the receiving party is through data communications between computers.

* * * * *